(No Model.)

W. JONES.
VEHICLE AXLE.

No. 421,002. Patented Feb. 11, 1890.

Witnesses
H. D. Nealy.
C. P. Bailey.

Inventor
Willis Jones.
by J. R. Drake
his Attorney.

N. PETERS, Photo-Lithographer, Washington, D. C.

UNITED STATES PATENT OFFICE.

WILLIS JONES, OF BUFFALO, NEW YORK, ASSIGNOR TO THE BUFFALO PATENT AXLE AND WHEEL COMPANY, OF SAME PLACE.

VEHICLE-AXLE.

SPECIFICATION forming part of Letters Patent No. 421,002, dated February 11, 1890.

Application filed October 31, 1889. Serial No. 328,788. (No model.)

*To all whom it may concern:*

Be it known that I, WILLIS JONES, (assignor of entire interest to the BUFFALO PATENT AXLE AND WHEEL COMPANY,) a citizen of the United States, residing at Buffalo, in the county of Erie and State of New York, have invented certain new and useful Improvements in Vehicle-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements on a patent for vehicle-axles, No. 391,219, dated October 16, 1888, assigned by the inventor, William H. Wright, March 15, 1889, to the Buffalo Patent Axle and Wheel Company, assignment recorded April 19, 1889, liber 40, page 4; and the invention consists in certain changes in the construction, whereby the revolving of the swivel-collar on the collar of the axle is greatly improved, and to remedy other defects in said patent; and the invention as constructed and applied will be understood by reference to the following specification and claim.

Figure 1:
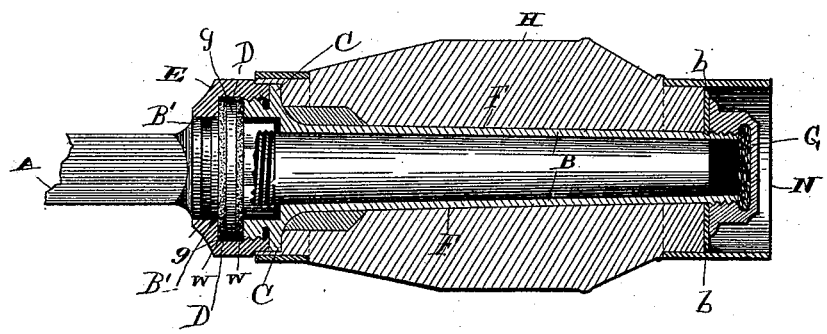
Figure 2:
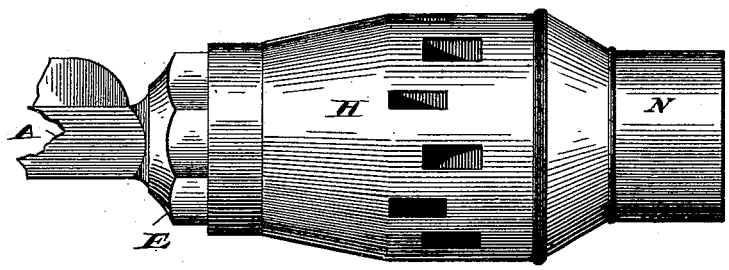

In the drawings, Figure 1 is a transverse sectional elevation of one end of a vehicle axle and hub; Fig. 2, an elevation of one hub and part of axle.

A represents the axle, and B the axle-bearing.

B' is the fixed collar on the axle A, grooved in the center, forming the sand-receptacle $g$ and giving a wide double bearing for the inner end of the swivel-nut E to revolve on. This nut also revolves over the movable flanged nut D, which is screwed on from the front of the axle A, occupying a reversed position to that in the patent previously referred to, and having washers $w$ $w$, of equal width, each side of the flange. (See Fig. 1.) This swivel-nut E goes on over axle A, covers the fixed collar B', the flanged nut D, and screws by internal threads onto the threads of the axle-box F and flush against a collar C of the box, and is partly covered by the inner rim of the hub H. The nut G on the front end of the box F screws squarely against the web $b$ of the band N, or the web may be a separate metallic washer over the end of the axle-box F. Reversing the flanged nut D on the axle brings the swivel-collar E back to revolve on the fixed double collar B', which gives double the bearing to work on, making the hub less liable to rock or wear. In the patent before referred to the hub revolves on the sleeve, which gives greater friction on the collar, nut, or sleeve, and which tends to loosen the nut, and is therefore more liable to have sand work in. In mine what sand or grit works in is carried into the sand-groove $g$.

Briefly stated, the revolving of the swivel nut or collar E on the double collar B' of the axle gives greater strength and steadiness where most required, and with the sand-groove and double washers $w$ $w$, one each side of the flange D, protects the washers from sand.

The swivel-nut E screwing directly against the shoulder C of the axle-box F is important, as it prevents rocking and loosening of the wheel on the axle and the jarring loose of the swivel-collar. It also prevents pinching the washers, which causes the wheel to "set."

I claim—

The combination of the axle A, having the double-bearing fixed collar B' thereon, provided with the annular sand-groove $g$, the movable flanged nut D, screwing on the front of said fixed collar and having washers $w$ $w$, one each side of said flange, the swivel-nut E, revolving on the double-bearing collar B' and screwing directly on the thread of the hub-box F, and abutting squarely against the raised flange C thereof, and the end nut G, screwing on the front end of the hub-box and against a washer or the web of the band N, all substantially as hereinbefore specified.

In testimony whereof I affix my signature in presence of two witnesses.

WILLIS JONES.

Witnesses:
 WATSON E. WING,
 FRED W. ANGELL.